(12) United States Patent
Kook et al.

(10) Patent No.: US 9,689,469 B2
(45) Date of Patent: Jun. 27, 2017

(54) TRANSMISSION FOR VEHICLES

(71) Applicant: Hyundai Motor Company, Seoul (KR)

(72) Inventors: Jae Chang Kook, Hwaseong-si (KR); Seong Wook Hwang, Gunpo-si (KR); Hyun Sik Kwon, Seoul (KR); Seong Wook Ji, Ansan-si (KR); Won Min Cho, Hwaseong-si (KR); Kang Soo Seo, Yongin-si (KR); Myeong Hoon Noh, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/886,432

(22) Filed: Oct. 19, 2015

(65) Prior Publication Data

US 2016/0363191 A1 Dec. 15, 2016

(30) Foreign Application Priority Data

Jun. 11, 2015 (KR) .................. 10-2015-0082502

(51) Int. Cl.
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01); *F16H 2200/2097* (2013.01)

(58) Field of Classification Search
None
See application file for complete search history.

(56) References Cited

U.S. PATENT DOCUMENTS

| 7,993,235 B2 | 8/2011 | Wittkopp et al. | |
| 8,052,567 B2 | 11/2011 | Hart et al. | |
| 2011/0177908 A1* | 7/2011 | Wittkopp | F16H 3/66 475/271 |
| 2016/0258515 A1* | 9/2016 | Cho | F16H 3/66 |

FOREIGN PATENT DOCUMENTS

| JP | 2013-0003981 A | 1/2013 |
| KR | 10-2013-0077146 A | 7/2013 |
| KR | 10-2016-0003494 A | 1/2016 |

* cited by examiner

*Primary Examiner* — Colby M Hansen
(74) *Attorney, Agent, or Firm* — Morgan Lewis & Bockius LLP

(57) ABSTRACT

A transmission for a vehicle includes first, second, third and fourth planetary gear set, and a plurality of friction members. Each planetary gear set includes three rotating elements. The friction elements selectively and operably connect the rotating elements of the planetary gear sets to control rotation of the rotating elements. The transmission improves fuel efficiency by increasing the number of gears and enhances driving stability of the vehicle using an operating point in a low RPM range of the engine.

10 Claims, 1 Drawing Sheet

| RANGE | C1 | C2 | C3 | C4 | C5 | C6 | GEAR RATIO |
|---|---|---|---|---|---|---|---|
| 1ST |  | O | O |  | O |  | 4.700 |
| 2ND |  | O |  |  | O | O | 2.278 |
| 3RD |  | O |  | O | O |  | 2.194 |
| 4TH |  |  |  | O | O | O | 1.822 |
| 5TH |  |  | O | O | O |  | 1.382 |
| 6TH |  |  | O |  | O | O | 1.239 |
| 7TH |  | O | O | O |  | O | 1.000 |
| 8TH | O |  | O |  |  | O | 0.778 |
| 9TH | O | O |  | O |  |  | 0.677 |
| 10TH | O | O |  |  |  | O | 0.655 |
| REV | O |  | O |  | O |  | −1.500 |

TRANSMISSION FOR VEHICLES

CROSS-REFERENCE TO RELATED APPLICATION

The present application claims priority of Korean Patent Application Number 10-2015-0082502 filed on Jun. 11, 2015, the entire contents of which application are incorporated herein for all purposes by this reference.

BACKGROUND OF THE INVENTION

Technical Field

The present invention relates to a transmission for vehicles capable of improving fuel efficiency by increasing the number of gears and enhancing driving stability of the vehicles using an operating point in a low revolution per minute (RPM) area of an engine.

Description of the Related Art

A recent rise in oil prices lets global car makers rush into limitless competition for improvement in fuel efficiency. In the case of an engine, efforts to reduce a weight of the engine and improve fuel efficiency using technologies such as downsizing have been actively conducted.

Meanwhile, in the case of an automatic transmission, it is possible to secure drivability and fuel efficiency competitiveness by a method for increasing the number of gear of an automatic transmission among various methods for improving fuel efficiency.

However, the larger the number of transmission levels, the larger the number of internal components configuring the automatic transmission becomes, and as a result mountability, cost, weight, transfer efficiency, etc., may be rather aggravated.

Therefore, to increase a fuel efficiency improvement effect by increasing the number of gears, it is important to devise a gear train structure which may draw maximum efficiency with the smaller number of components The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

An object of the present invention is to provide a transmission for vehicles capable of improving fuel efficiency by increasing the number of gears and enhancing driving stability of the vehicles using an operating point in a low RPM range of an engine.

According to various aspects of the present invention, there is provided a transmission for vehicles configured to include: a first planetary gear set, a second planetary gear set, a third planetary gear set, and a fourth planetary gear set each having three rotating elements; and a plurality of friction members, wherein: the first planetary gear set configured to include a first rotating element connected to an input shaft, the second rotating element selectively connected to a first rotating element of the second planetary gear set and a third rotating element of the second planetary gear set while being operated as a selectively fixed element, and a third rotating element connected to a second rotating element of the second planetary gear set; the third planetary gear set configured to include a first rotating element selectively connected to the second rotating element of the second planetary gear set and the third rotating element of the second planetary gear set, a second rotating element connected to an input shaft, and a third rotating element connected to an output shaft; the fourth planetary gear set configured to include a first rotating element selectively connected to the first rotating element of the second planetary gear set, a second rotating element connected to the output shaft, and a third rotating element operated as a fixed element; and the friction elements selectively and operably connect the rotating elements of the planetary gear sets to control rotation of the rotating elements.

The first rotating element of the first planetary gear set may be a first sun gear, the second rotating element thereof may be a first carrier, and the third rotating element thereof may be a first ring gear, the first rotating element of the second planetary gear set may be a second sun gear, the second rotating element thereof may be a second carrier, and the third rotating element thereof may be a second ring gear, the first rotating element of the third planetary gear set may be a third sun gear, the second rotating element thereof may be a third carrier, and the third rotating element thereof may be a third ring gear, and the first rotating element of the fourth planetary gear set may be a fourth sun gear, the second rotating element thereof may be a fourth carrier, and the third rotating element thereof may be a fourth ring gear.

The second rotating element of the first planetary gear set may be controllably connected to a transmission case by a first clutch, the second rotating element of the first planetary gear set and the first rotating element of the second planetary gear set may be controllably connected to each other by a second clutch, and the second rotating element of the first planetary gear set and the third rotating element of the second planetary gear set may be controllably connected to each other by a third clutch.

The first rotating element of the third planetary gear set and the second rotating element of the second planetary gear set may be controllably connected to each other by a fourth clutch, and the first rotating element of the third planetary gear set and the third rotating element of the second planetary gear set may be controllably connected to each other by a sixth clutch.

The first rotating element of the fourth planetary gear set and the first rotating element of the second planetary gear set may be controllably connected to each other by a fifth clutch and the third rotating element of the fourth planetary gear set may be fixedly connected to a transmission case.

The first planetary gear set, the second planetary gear set, the third planetary gear set, and the fourth planetary gear set may be sequentially arranged in an axial direction of the input shaft or the output shaft.

The friction elements may include: a first clutch configured to operably connect the second rotating element of the first planetary gear set and a transmission case; a second clutch configured to operably connect the second rotating element of the first planetary gear set and the first rotating element of the second planetary gear set; a third clutch configured to operably connect the second rotating element of the first planetary gear set and the third rotating element of the second planetary gear set; a fourth clutch configured to operably connect the second rotating element of the second planetary gear set and the first rotating element of the third planetary gear set; a fifth clutch configured to operably connect the first rotating element of the second planetary gear set and the first rotating element of the fourth planetary gear set; and a sixth clutch configured to operably connect the third rotating element of the second planetary gear set and the first rotating element of the third planetary gear set.

According to various other aspects of the present invention, there is provided a transmission for vehicles configured to include a first planetary gear set, a second planetary gear set, a third planetary gear set, and a fourth planetary gear set each having three rotating elements, the transmission including: an input shaft configured to be connected to a first rotating element of the first planetary gear set and a second rotating element of the third planetary gear set; a first shaft configured to connect the second rotating element of the first planetary gear set to a first clutch, a second clutch, and a third clutch; a second shaft configured to connect the third rotating element of the first planetary gear set to a second rotating element of the second planetary gear set and a fourth clutch; a third shaft configured to connect the first rotating element of the second planetary gear set to the second clutch and a fifth clutch; a fourth shaft configured to connect the third rotating element of the second planetary gear set to the third clutch and a sixth clutch; a fifth shaft configured to connect the first rotating element of the third planetary gear set to the fourth clutch and the sixth clutch; a sixth shaft configured to connect the first rotating element of the fourth planetary gear set to a fifth clutch; an output shaft configured to be connected to a third rotating element of the third planetary gear set and a second rotating element of the fourth planetary gear set; and a transmission case configured to be connected to a third rotating element of the fourth planetary gear set and the first clutch.

The first clutch may operably connect the first shaft and the transmission case, the second clutch may operably connect the first shaft and the third shaft, the third clutch may operably connect the first shaft and the fourth shaft, the fourth clutch may operably connect the second shaft and the fifth shaft, the fifth clutch may operably connect the third shaft and the sixth shaft, and the sixth clutch may operably connect the fourth shaft and the fifth shaft.

The first clutch may operably connect the second rotating element of the first planetary gear set and the transmission case, the second clutch may operably connect the second rotating element of the first planetary gear set and the first rotating element of the second planetary gear set, the third clutch may operably connect the second rotating element of the first planetary gear set and the third rotating element of the second planetary gear set, the fourth clutch may operably connect the second rotating element of the second planetary gear set and the first rotating element of the third planetary gear set, the fifth clutch may operably connect the first rotating element of the second planetary gear set and the first rotating element of the fourth planetary gear set, and the sixth clutch may operably connect the third rotating element of the second planetary gear set and the first rotating element of the third planetary gear set.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figures 1, 2:
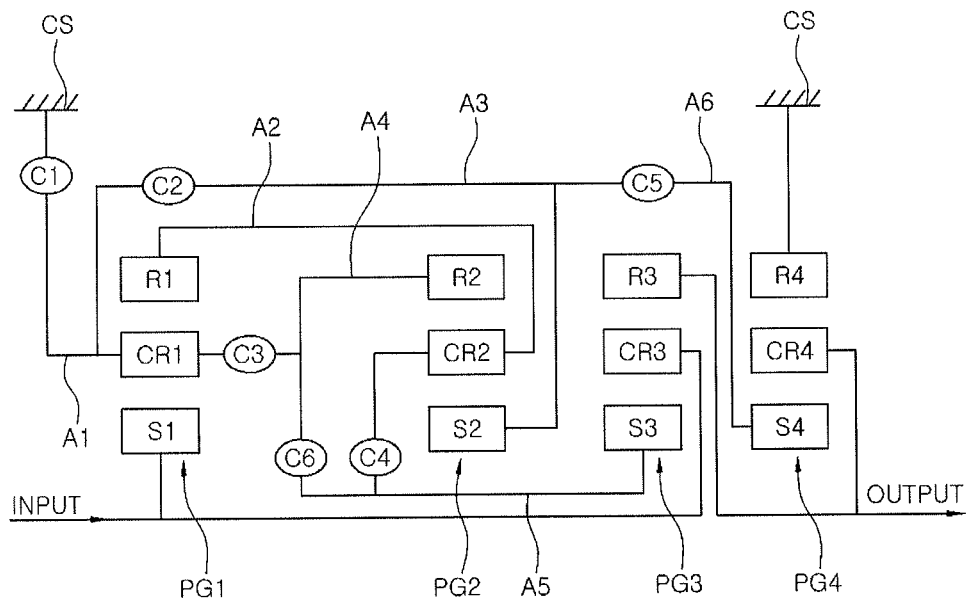
FIG. 1 is a view schematically illustrating a structure of a transmission for vehicles according to an exemplary embodiment of the present invention.
FIG. 2 is an operating table for each transmission level of the transmission for vehicles according to an exemplary embodiment of the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A transmission for vehicles according to an exemplary embodiment of the present invention is configured to include a first planetary gear set PG1, a second planetary gear set PG2, a third planetary gear set PG3, and a fourth planetary gear set PG4, in which each of the planetary gear sets may include a plurality of rotating elements such as three rotating elements, that is, first, second, and third rotating elements.

Referring to FIG. 1, the first rotating element of the first planetary gear set PG1 may be connected to an input shaft INPUT. For example, the first rotating element of the first planetary gear set PG1 may be a first sun gear S1 which may be directly connected to the input shaft INPUT to serve as an input element always.

Further, the second rotating element of the first planetary gear set PG1 may serve as a selectively fixed element. For example, the second rotating element of the first planetary gear set PG1 may be a first carrier CR1 which may be controllably or operably connected to a transmission case CS by a friction element.

Further, the second rotating element of the first planetary gear set PG1 may be selectively connected to a first rotating element of the second planetary gear set PG2. For example, the first rotating element of the second planetary gear set PG2 may be a second sun gear S2, in which the first carrier CR1 and the second sun gear S2 may be controllably or operably connected to each other by a friction element.

Further, the second rotating element of the first planetary gear set PG1 may be selectively connected to a third rotating element of the second planetary gear set PG2. For example, the third rotating element of the second planetary gear set PG2 may be a second ring gear R2, in which the first carrier CR1 and the second ring gear R2 may be controllably or operably connected to each other by a friction element.

Further, the third rotating element of the first planetary gear set PG1 may be connected to the second rotating element of the second planetary gear set PG2. For example, the third rotating element of the first planetary gear set PG1 may be a first ring gear R1 and the second rotating element of the second planetary gear set PG2 may be a second carrier CR2, in which the first ring gear R1 and the second carrier CR2 may be directly connected to each other.

Next, the first rotating element of the third planetary gear set PG3 may be selectively connected to the second rotating element of the second planetary gear set PG2. For example, the first rotating element of the third planetary gear set PG3 may be a third sun gear S3 and the second rotating element of the second planetary gear set PG2 may be the second carrier CR2, in which the third sun gear S3 and the second carrier CR2 may be controllably or operably connected to each other by a friction element.

Further, the first rotating element of the third planetary gear set PG3 may be selectively connected to the third rotating element of the second planetary gear set PG2. For example, the third rotating element of the second planetary gear set PG2 may be the second ring gear R2, in which the third sun gear S3 and the second ring gear R2 may be controllably or operably connected to each other by a friction element.

Further, the second rotating element of the third planetary gear set PG3 may be connected to the input shaft INPUT. For example, the second rotating element of the third planetary gear set PG3 may be a third carrier CR3 which may be directly connected to the input shaft INPUT to serve as an input element always.

Further, the third rotating element of the third planetary gear set PG3 may be connected to an output shaft OUTPUT. For example, the third rotating element of the third planetary gear set PG3 may be a third ring gear R3 which may be directly connected to the output shaft OUTPUT to serve as an output element always.

Next, the first rotating element of the fourth planetary gear set PG4 may be selectively connected to the first rotating element of the second planetary gear set PG2. For example, the first rotating element of the fourth planetary gear set PG4 may be a fourth sun gear S4 and the first rotating element of the second planetary gear set PG2 may be the second sun gear S2, in which the fourth sun gear S4 and the second sun gear S2 may be controllably or operably connected to each other by a friction element.

Further, the second rotating element of the fourth planetary gear set PG4 may be connected to the output shaft OUTPUT. For example, the second rotating element of the fourth planetary gear set PG4 may be a fourth carrier CR4 which may be directly connected to the output shaft OUTPUT to serve as an output element.

Further, the third rotating element of the fourth planetary gear set PG4 may serve as a fixed element. For example, the third rotating element of the fourth planetary gear set PG4 may be a fourth ring gear R4 which may be directly connected to the transmission case CS to serve as the fixed element always.

Further, the first planetary gear set PG1, the second planetary gear set PG2, the third planetary gear set PG3, and the fourth planetary gear set PG4 according to an exemplary embodiment of the present invention may be sequentially arranged along directions of the input shaft INPUT and the output shaft OUTPUT, in which the first planetary gear set PG1, the second planetary gear set PG2, the third planetary gear set PG3, and the fourth planetary gear set PG4 all may be a single pinion planetary gear device.

In some embodiments, the present invention may be configured to further include a plurality of friction elements which are connected to at least one of the rotating elements forming the planetary gear sets to control the rotation of the rotating elements. The friction element may be first, second, third, fourth, fifth, and sixth clutches C1, C2, C3, C4, C5, and C6.

In detail, the first clutch C1 may operably connect the first carrier CR1, which is the second rotating element of the first planetary gear set PG1, and the transmission case CS.

The second clutch C2 may operably connect the first carrier CR1 which is the second rotating element of the first planetary gear set PG1 and the second sun gear S2 which is the first rotating element of the second planetary gear set PG2.

The third clutch C3 may operably connect the first carrier CR1 which is the second rotating element of the first planetary gear set PG1 and the second ring gear R2 which is the third rotating element of the second planetary gear set PG2.

The fourth clutch C4 may operably connect the second carrier CR2 which is the second rotating element of the second planetary gear set PG2 and the third sun gear S3 which is the first rotating element of the third planetary gear set PG3.

The fifth clutch C5 may operably connect the second sun gear S2 which is the first rotating element of the second planetary gear set PG2 and the fourth sun gear S4 which is the first rotating element of the fourth planetary gear set PG4.

The sixth clutch C6 may operably connect the second ring gear R2 which is the third rotating element of the second planetary gear set PG2 and the third sun gear S3 which is the first rotating element of the third planetary gear set PG3.

Meanwhile, the present invention may be configured by connecting the rotating elements forming each of the planetary gear sets to the input shaft INPUT, a first shaft A1 to a sixth shaft A6, and the output shaft OUTPUT.

Referring to FIG. 1, the first rotating element of the first planetary gear set PG1 and the second rotating element of the third planetary gear set PG3 each may be directly connected to the input shaft INPUT.

The second rotating element of the first planetary gear set PG1, one end of the first clutch C1, one end of the second clutch C2, and one end of the third clutch C3 may be each connected to the first shaft A1.

The third rotating element of the first planetary gear set PG1, the second rotating element of the second planetary gear set PG2, and one end of the fourth clutch C4 may each be connected to the second shaft A2.

The first rotating element of the second planetary gear set PG2, the other end of the second clutch C2, and one end of the fifth clutch C5 may each be connected to the third shaft A3.

The third rotating element of the second planetary gear set PG2, the other end of the third clutch C3, and one end of the sixth clutch C6 may each be connected to the fourth shaft A4.

The first rotating element of the third planetary gear set PG3, the other end of the fourth clutch C4, and the other end of the sixth clutch C6 may each be connected to the fifth shaft A5.

The first rotating element of the fourth planetary gear set PG4 and the other end of the fifth clutch C5 may each be connected to the sixth shaft A6.

The third rotating element of the third planetary gear set PG3 and the second rotating element of the fourth planetary gear set PG4 may be each connected to the output shaft OUTPUT.

Further, the third rotating element of the fourth planetary gear set PG4 and the other end of the first clutch C1 may each be connected to the transmission case CS.

For example, the first clutch C1 may operably connect the first shaft A1 and the transmission case CS, the second clutch C2 may operably connect the first shaft A1 and the third shaft A3, and the third clutch C3 may operably connect the first shaft A1 and the fourth shaft A4.

Further, the fourth clutch C4 may operably connect the second shaft A2 and the fifth shaft A5, the fifth clutch C5 may operably connect the third shaft A3 and the sixth shaft A6, and the sixth clutch C6 may operably connect the fourth shaft A4 and the fifth shaft A5.

FIG. 2 is an operating table for each transmission level of the transmission for vehicles according to the exemplary embodiment of the present invention. For example, the second clutch C2, the third clutch C3, and the fifth clutch C5 are engaged to implement a one-stage gear ratio and the rest friction elements all may be opened to implement the one stage gear ratio.

Further, to implement a two-stage gear ratio, the second clutch C2, the fifth clutch C5, and the sixth clutch C6 are engaged and the rest friction elements all may be opened to implement the two-stage gear ratio. Further, the rest transmission levels are subjected to the control operation as illustrated in the operating table to implement the gear ratio corresponding to the corresponding transmission level.

As described above, according to the exemplary embodiments of the present invention, the rotating elements forming the first, second, third, and fourth planetary gear sets PG1, PG2, PG3 and PG4 are selectively controlled by the plurality of clutches to have the rotating speeds and the directions changed and have the shifting made, thereby implementing the gear ratio of at least ten forward stages and one reverse stage. Therefore, it is possible to improve the fuel efficiency by increasing the number of gears of the automatic transmission and enhancing the driving stability of vehicles by using the operating point in the low RPM area of the engine.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for vehicles, comprising:
a first planetary gear set, a second planetary gear set, a third planetary gear set, and a fourth planetary gear set each having three rotating elements; and
a plurality of friction members, wherein:
the first planetary gear set includes:
a first rotating element connected to an input shaft;
a second rotating element selectively connected to a first rotating element of the second planetary gear set a third rotating element of the second planetary gear set and a transmission housing, respectively; and
a third rotating element connected to a second rotating element of the second planetary gear set,
the third planetary gear set includes:
a first rotating element selectively connected to the second rotating element of the second planetary gear set and the third rotating element of the second planetary gear set, respectively;
a second rotating element connected to the input shaft; and
a third rotating element connected to an output shaft,
the fourth planetary gear set includes:
a first rotating element selectively connected to the first rotating element of the second planetary gear set;
a second rotating element connected to the output shaft; and
a third rotating element fixed to the transmission housing; and
the friction elements selectively and operably connect the rotating elements of the planetary gear sets to control rotation of the rotating elements.

2. The transmission of claim 1, wherein:
the first rotating element of the first planetary gear set is a first sun gear, the second rotating element thereof is a first carrier, and the third rotating element thereof is a first ring gear,
the first rotating element of the second planetary gear set is a second sun gear, the second rotating element thereof is a second carrier, and the third rotating element thereof is a second ring gear,
the first rotating element of the third planetary gear set is a third sun gear, the second rotating element thereof is a third carrier, and the third rotating element thereof is a third ring gear, and
the first rotating element of the fourth planetary gear set is a fourth sun gear, the second rotating element thereof is a fourth carrier, and the third rotating element thereof is a fourth ring gear.

3. The transmission of claim 2, wherein:
the second rotating element of the first planetary gear set is controllably connected to a transmission case by a first clutch,
the second rotating element of the first planetary gear set and the first rotating element of the second planetary gear set are controllably connected to each other by a second clutch, and
the second rotating element of the first planetary gear set and the third rotating element of the second planetary gear set are controllably connected to each other by a third clutch.

4. The transmission of claim 2, wherein:
the first rotating element of the third planetary gear set and the second rotating element of the second planetary gear set are controllably connected to each other by a fourth clutch, and
the first rotating element of the third planetary gear set and the third rotating element of the second planetary gear set are controllably connected to each other by a sixth clutch.

5. The transmission of claim 2, wherein:
the first rotating element of the fourth planetary gear set and the first rotating element of the second planetary gear set are controllably connected to each other by a fifth clutch and
the third rotating element of the fourth planetary gear set is fixedly connected to a transmission case.

6. The transmission of claim 2, wherein the first planetary gear set, the second planetary gear set, the third planetary gear set, and the fourth planetary gear set are sequentially arranged in an axial direction of the input shaft or the output shaft.

7. The transmission of claim 1, wherein the friction elements include:
a first clutch configured to operably connect the second rotating element of the first planetary gear set and a transmission case;
a second clutch configured to operably connect the second rotating element of the first planetary gear set and the first rotating element of the second planetary gear set;
a third clutch configured to operably connect the second rotating element of the first planetary gear set and the third rotating element of the second planetary gear set;

a fourth clutch configured to operably connect the second rotating element of the second planetary gear set and the first rotating element of the third planetary gear set;

a fifth clutch configured to operably connect the first rotating element of the second planetary gear set and the first rotating element of the fourth planetary gear set; and a sixth clutch configured to operably connect the third rotating element of the second planetary gear set and the first rotating element of the third planetary gear set.

8. A transmission for vehicles configured to include a first planetary gear set, a second planetary gear set, a third planetary gear set, and a fourth planetary gear set each having three rotating elements, the transmission comprising:

an input shaft configured to be connected to a first rotating element of the first planetary gear set and a second rotating element of the third planetary gear set;

a first shaft configured to connect a second rotating element of the first planetary gear set to a first clutch, a second clutch, and a third clutch;

a second shaft configured to connect a third rotating element of the first planetary gear set to a second rotating element of the second planetary gear set and a fourth clutch;

a third shaft configured to connect a first rotating element of the second planetary gear set to the second clutch and a fifth clutch;

a fourth shaft configured to connect a third rotating element of the second planetary gear set to the third clutch and a sixth clutch;

a fifth shaft configured to connect a first rotating element of the third planetary gear set to the fourth clutch and the sixth clutch;

a sixth shaft configured to connect a first rotating element of the fourth planetary gear set to the fifth clutch;

an output shaft configured to be connected to a third rotating element of the third planetary gear set and a second rotating element of the fourth planetary gear set; and a transmission case configured to be connected to a third rotating element of the fourth planetary gear set and the first clutch.

9. The transmission of claim 8, wherein:

the first clutch operably connects the first shaft and the transmission case, the second clutch operably connects the first shaft and the third shaft, the third clutch operably connects the first shaft and the fourth shaft, the fourth clutch operably connects the second shaft and the fifth shaft, the fifth clutch operably connects the third shaft and the sixth shaft, and the sixth clutch operably connects the fourth shaft and the fifth shaft.

10. The transmission of claim 9, wherein:

the first clutch operably connects the second rotating element of the first planetary gear set and the transmission case, the second clutch operably connects the second rotating element of the first planetary gear set and the first rotating element of the second planetary gear set, the third clutch operably connects the second rotating element of the first planetary gear set and the third rotating element of the second planetary gear set, the fourth clutch operably connects the second rotating element of the second planetary gear set and the first rotating element of the third planetary gear set, the fifth clutch operably connects the first rotating element of the second planetary gear set and the first rotating element of the fourth planetary gear set, and the sixth clutch operably connects the third rotating element of the second planetary gear set and the first rotating element of the third planetary gear set.

\* \* \* \* \*